(12) United States Patent
Santamaria

(10) Patent No.: US 7,562,895 B2
(45) Date of Patent: Jul. 21, 2009

(54) FOLDABLE CHASSIS FOR BABY CARRIAGES

(75) Inventor: Manuel Jane Santamaria, Barcelona (ES)

(73) Assignee: Jane, S.A., Barcelona (ES)

( * ) Notice: Subject to any disclaimer, the term of this patent is extended or adjusted under 35 U.S.C. 154(b) by 512 days.

(21) Appl. No.: 11/304,146

(22) Filed: Dec. 14, 2005

(65) Prior Publication Data

US 2006/0125211 A1 Jun. 15, 2006

(30) Foreign Application Priority Data

Dec. 14, 2004 (ES) .............................. 200402802 U
Feb. 17, 2005 (ES) .............................. 200500362 U

(51) Int. Cl.
*B62B 3/02* (2006.01)
(52) U.S. Cl. ....................... 280/642; 280/650; 280/657; 280/47.38
(58) Field of Classification Search ................. 280/638, 280/639, 642, 647, 650, 657, 47.38, 47.39, 280/47.4, 47.41
See application file for complete search history.

(56) References Cited

U.S. PATENT DOCUMENTS 4,542,916 A * 9/1985 Kassai .......................... 280/642
5,863,061 A * 1/1999 Ziegler et al. ................ 280/642
6,428,034 B1 * 8/2002 Bost ............................ 280/650
6,550,802 B2 * 4/2003 Sheehan ..................... 280/658
7,021,651 B2 * 4/2006 Lan ............................. 280/642
7,178,822 B2 * 2/2007 Chen .......................... 280/642

* cited by examiner

*Primary Examiner*—Christopher P Ellis
*Assistant Examiner*—John D Walters
(74) *Attorney, Agent, or Firm*—Jordan and Hamburg LLP

(57) ABSTRACT

A foldable chassis for baby carriages is provided which includes a base frame formed by two frontally converging side members disposed at their front portions linked in a pin-jointed connection to a front support, and two inclined arms disposed at their lower ends respectively linked in a pin-jointed connection to the front portion of the side members Each of the two branches of the handlebar slidably fits onto the arms. The front portion of the branches of the handlebar is respectively connected with the rear portion of the base side members by two crossed links. The branches of the handlebar are telescopically fitted to the two inclined arms and the handlebar branches is pin-jointedly linked to the rear region of the side members by a respective strut. The struts are connected with each other with components that are fit to lock the unfolded position of the chassis.

7 Claims, 4 Drawing Sheets

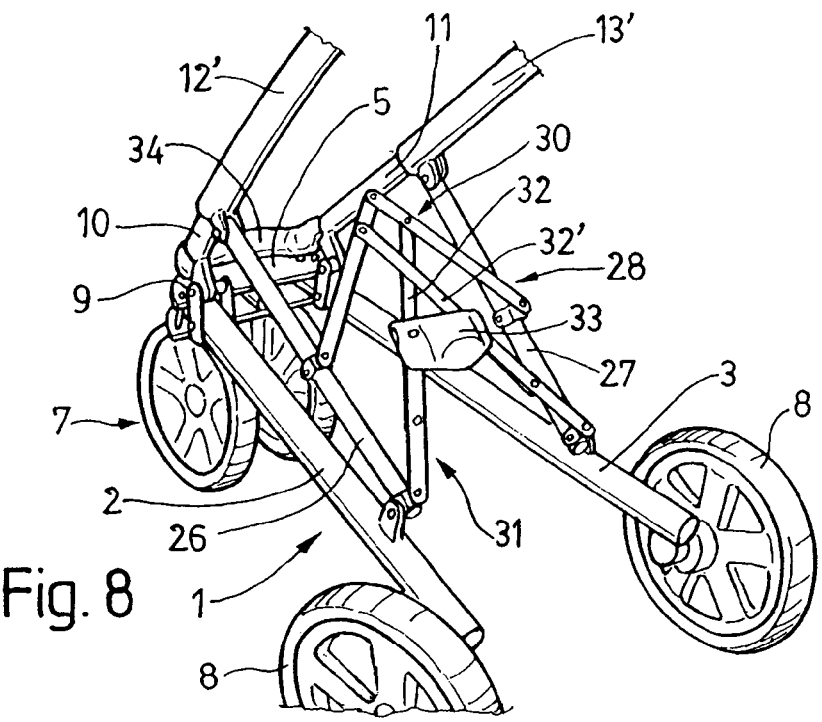
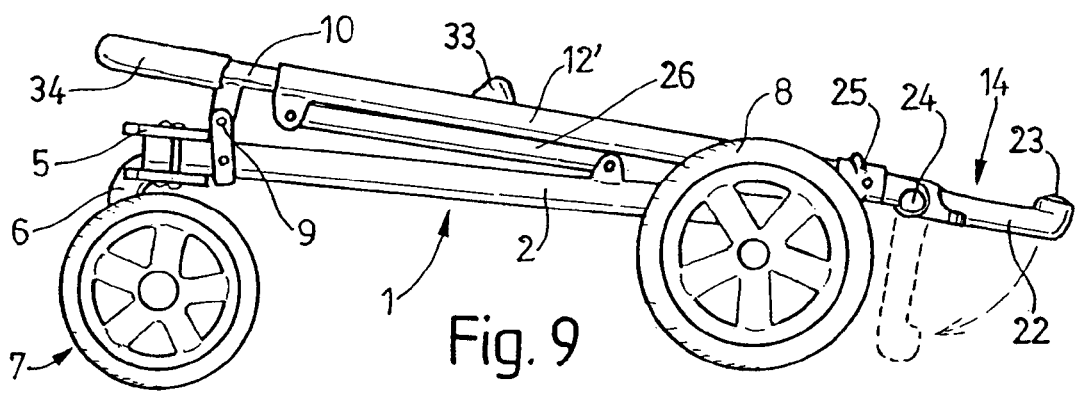
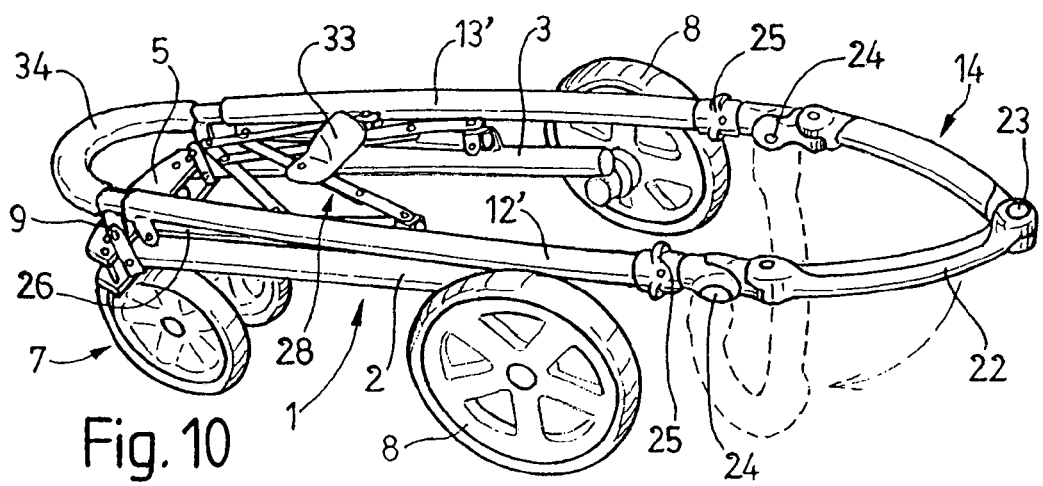

FOLDABLE CHASSIS FOR BABY CARRIAGES

OBJECT OF THE INVENTION

A foldable chassis for baby carriages.

BACKGROUND OF THE INVENTION

There are different models of foldable chassis for baby carriages, said foldable chassis generally comprising two front legs and two rear legs respectively ending in the corresponding wheels and being connected with each other and with the branches of a handlebar.

Foldable chassis are also known which comprise only three wheels, i.e. two rear wheels and a central front one, the front legs being arranged in an inferiorly converging arrangement in these foldable chassis.

SUMMARY OF THE INVENTION

The foldable chassis for baby carriages being the object of the invention does also have two rear wheels and one only front wheel possibly being a double one, but it has a fully novel structure entailing a notable simplification and allowing to achieve a very compact folded arrangement.

A characterizing feature for such a purpose lies in the makeup of the chassis, this latter comprising a base frame being formed by two frontally converging side members being at each of their front portions linked in a pin-jointed connection to a front support, and two inclined arms being at each of their lower ends respectively linked in a pin-jointed connection to the front portion of each of said side members, each of the two branches of the handlebar being slidably fitted onto each of said arms, respectively, the front portion of each of the branches of the handlebar being respectively connected with the rear portion of each of the base side members by means of two crossed links.

For the purpose of further facilitating the compact folding of the chassis the middle length of the handlebar is linked in a pin-jointed connection to the branches of said handlebar and is as well provided with an intermediary articulation.

The wheels are fitted to the rear portion of the base side members and to the front support.

The chassis is provided with means being operable to assure its unfolding, and with other means for locking and unlocking said unfolded arrangement for using the baby carriage.

It has also been foreseen to telescopically fit the branches of the handlebar to the upwardly inclined arms, each of said branches being at its front portion pin-jointedly linked to the rear region of each of the side members by means of a respective strut, said struts being connected with each other with means being fit to lock the unfolded position of the chassis.

These and other features will be best made apparent by the following detailed description whose understanding will be made easier by the accompanying four sheets of drawings showing two practical embodiments being cited only by way of example not limiting the scope of the present invention.

DESCRIPTION OF THE DRAWINGS

In the drawings:

FIGS. 7 and 8 illustrate the lower portion of the chassis of FIG. 6 in an intermediary folding stage as seen from the side and in a perspective view from the rear, respectively; and FIGS. 9 and 10 respectively represent in a side elevation and in a perspective view the chassis of FIG. 6 in a folded state.

DETAILED DESCRIPTION

Figure 1:
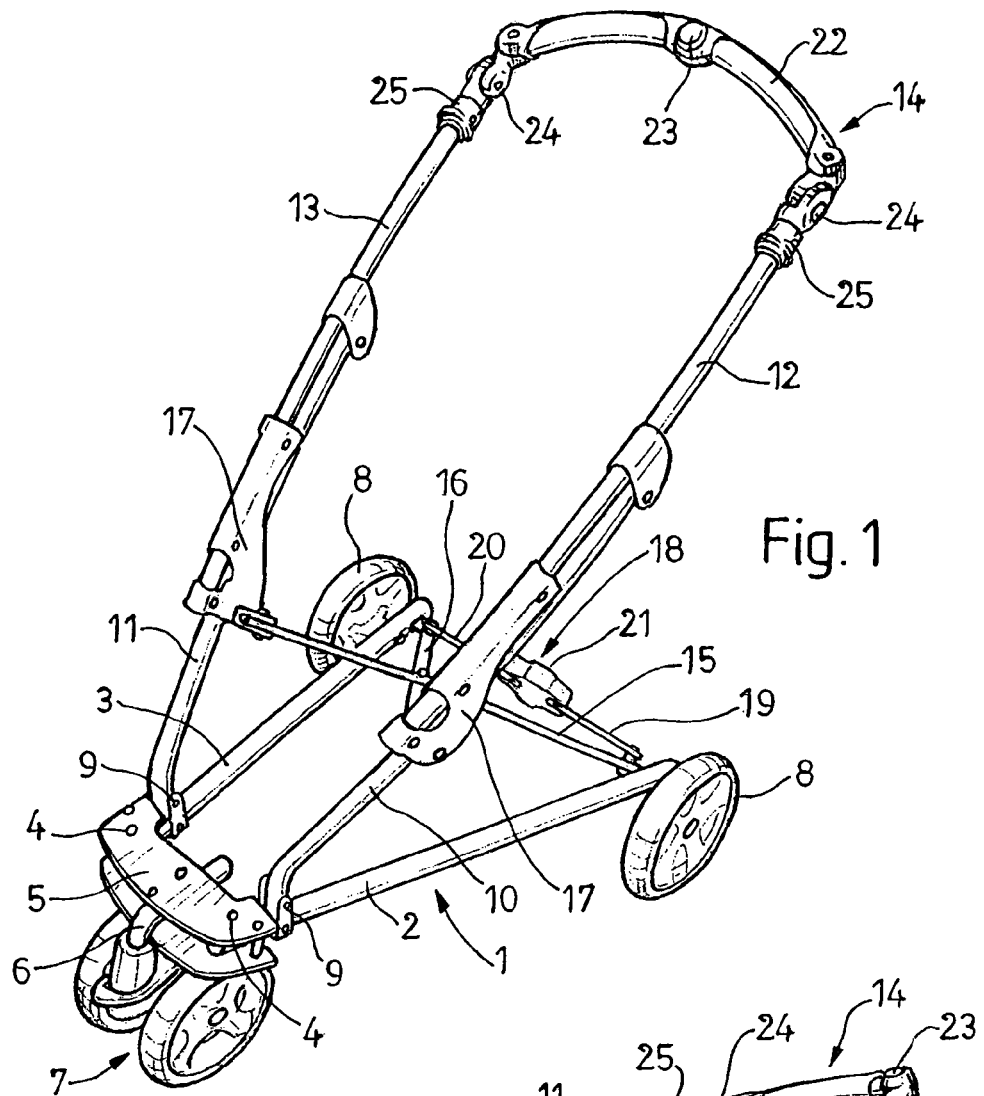
FIG. 1 shows in a perspective view the chassis being the object of the invention.
Figure 2:
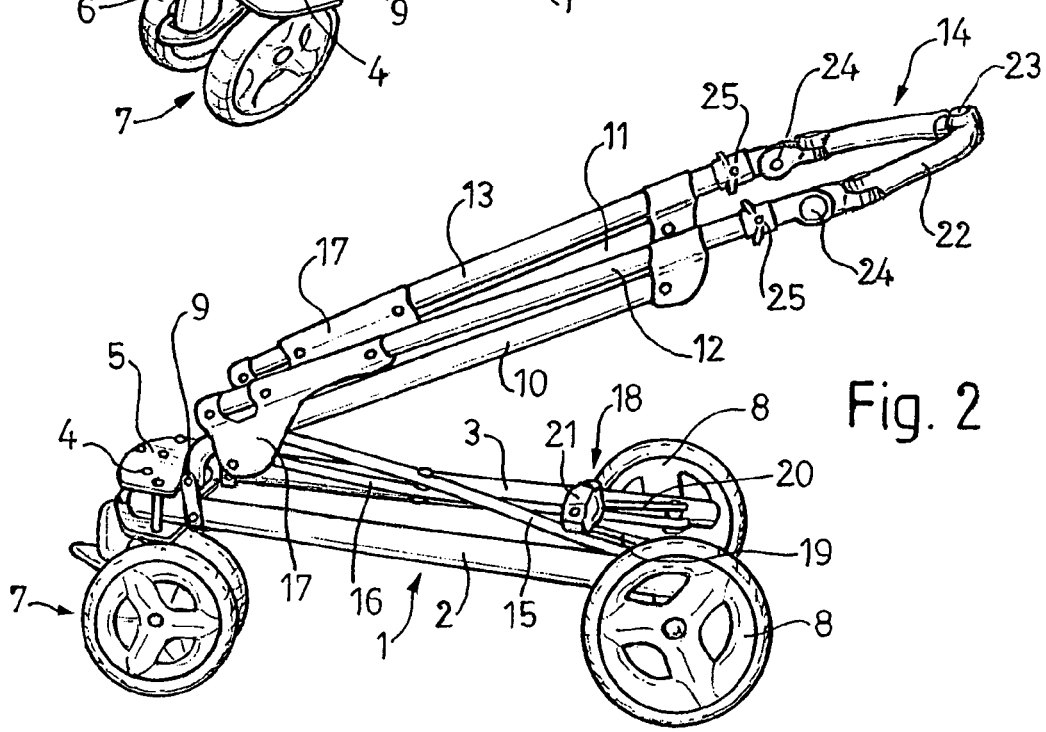
FIGS. 2, 3 and 4 illustrate said chassis at successive folding stages.
Figure 3:
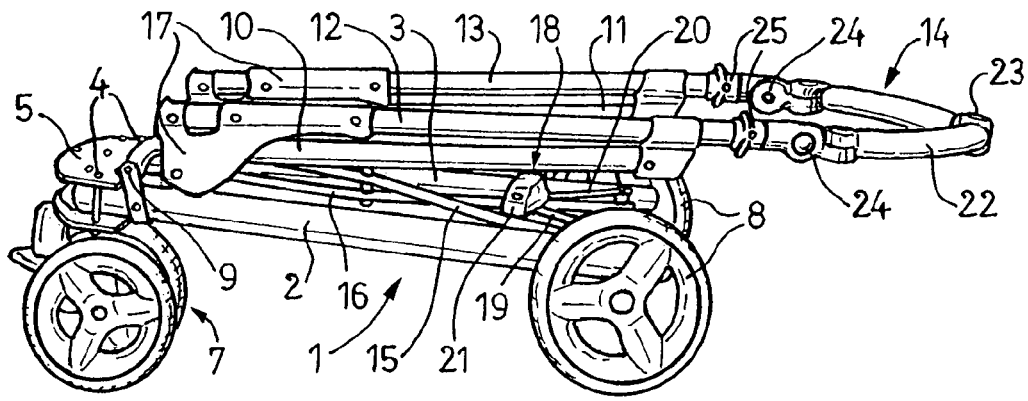

According to the drawings the chassis for baby carriages comprises a base frame (1) being formed by two frontally converging side members (2) and (3) being at each of their front portions and by means of pins (4) linked in a pin-jointed connection to a transversal front support (5) to whose central portion a bent pin (6) is fixed, this latter having a castoring double wheel (7) fitted to it. A wheel (8) is fitted to each of the rear ends of the side members (2) and (3).

Respective inclined arms (10) and (11) are linked in a pin-jointed connection and by means of respective pins (9) to the front portion of said side members, the branches (12) and (13) of a U-shaped handlebar (14) being respectively arranged in a slidable arrangement on said inclined arms.

The front ends of the branches of the handlebar are pin-jointedly connected with the rear ends of the side members (2) and (3) by means of two crossed links (15) and (16), these latter being linked in a pin-jointed connection to the handlebar branches at the end of a bracket (17) being solid with said branches.

At the pin-jointed connection of the links (15) and (16) to the side members (2) and (3) a cross member (18) is also linked in a pin-jointed connection and is formed by two end lengths (19) and (20) being linked in a pin-jointed connection to a central length (21) acting as a pedal for folding said cross member, this latter assuring the unfolding of the base frame (1).

Figure 4:
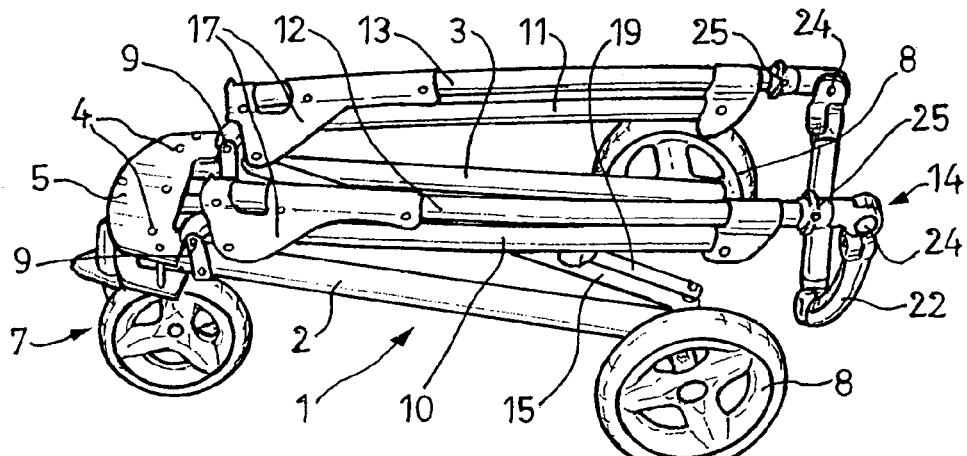
Figure 5:
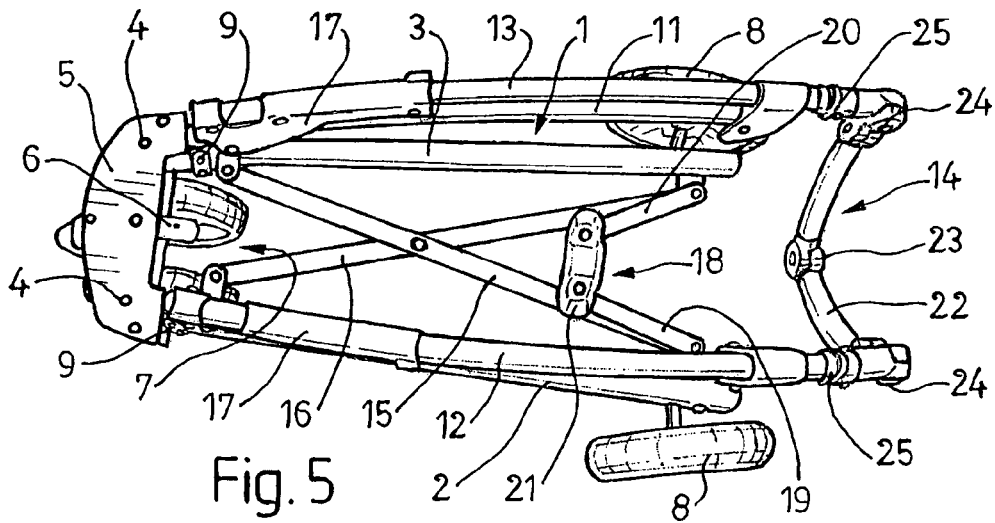
FIG. 5 represents the folded chassis in a plan-view.
Figure 6:
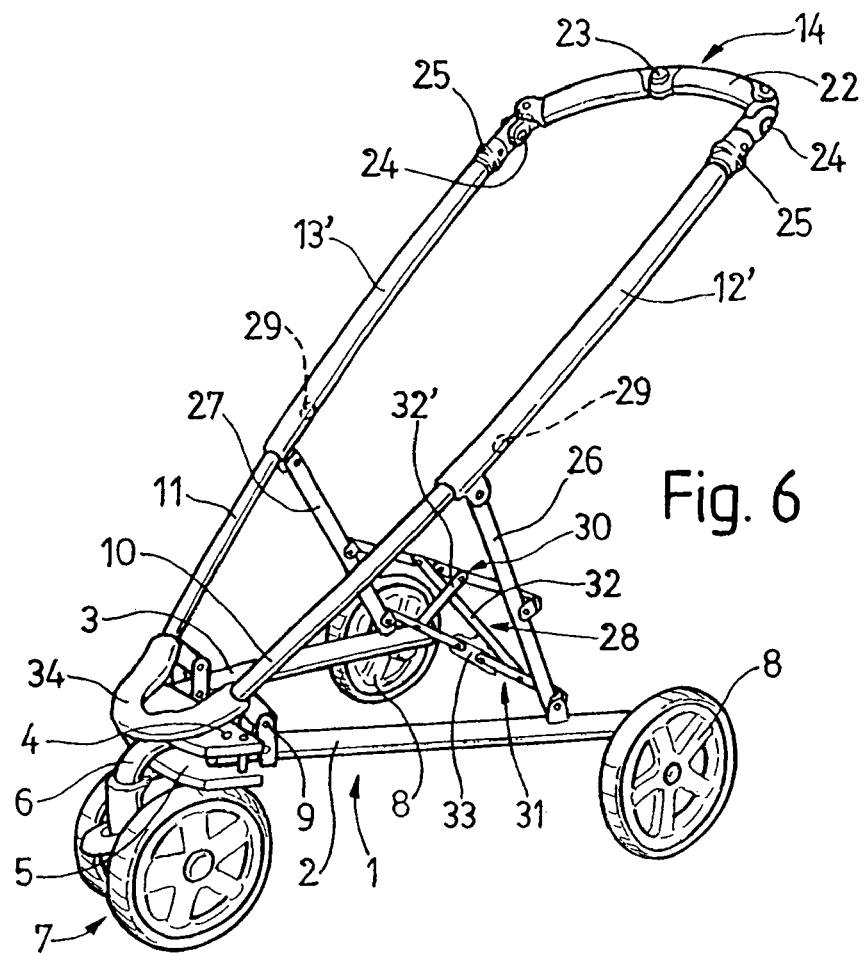
FIG. 6 shows in a perspective view a second embodiment of the chassis.
Figure 7:
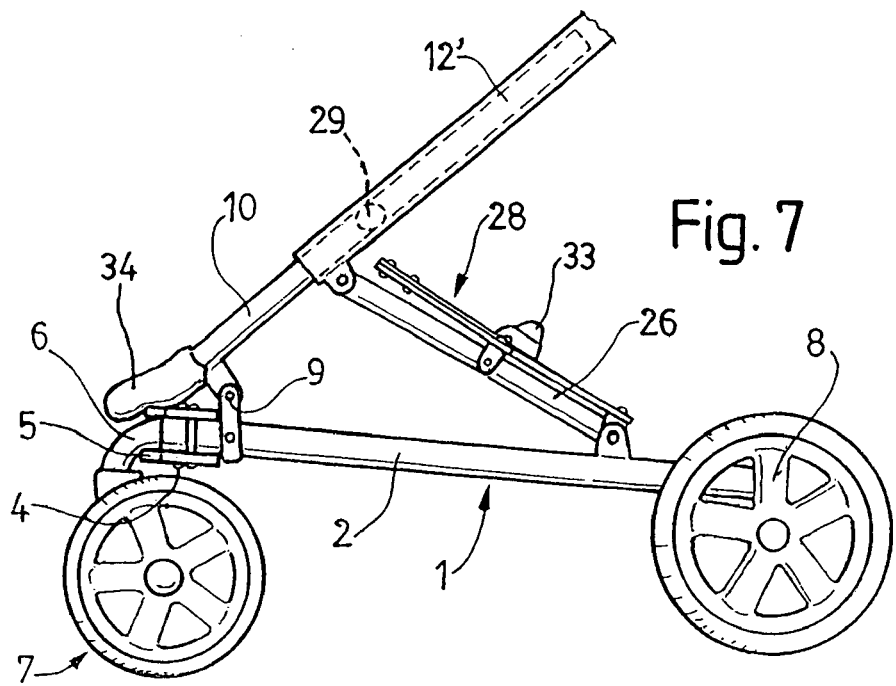

In order to allow the folding of the chassis the middle length (22) of the handlebar (14) has an intermediary articulation (23), and in order to obtain a folded arrangement being as compact as possible (FIG. 4) said middle length (22) is linked in a pin-jointed connection to each of the handlebar branches (12) and (13) by means of a respective articulation (24).

At (25) are shown each of two control bushings being fitted onto the handlebar branches (12) and (13) and being operable to unlock the means (not shown) being fit to lock the unfolded arrangement of the chassis and linking the handlebar branches to the inclined arms (10) and (11).

In the embodiment of FIGS. 6 through 10 the inclined arms (10) and (11) telescopically receive the respective branches (12') and (13') of the U-shaped handlebar (14), each of said branches being at its front portion linked in a pin-jointed connection to the rear region of each of the side members by means of a respective strut (26) and (27), these latter being mutually connected with means (28) being fit to lock the unfolded position of the chassis.

Between the arms (10) and (11) and the handlebar branches (12') and (13') there are locking means (29) being fit to lock their extended arrangement, said locking means being fit to be unlocked by means of the controls (25).

The locking means being provided between the struts (26) and (27) consist in two compasses (30) and (31) being pin-jointedly connected to each other by means of two crossed links (32) and (32'), the lower compass having an actuating pedal (33).

The two arms (10) and (11) are connected with each other at their front end with a tube-shaped, flexible connection (34).

Those components being adequate for the baby's comfort and safety will be affixed to this chassis.

I claim:

1. A foldable chassis for baby carriages, configurable to folded and unfolded states, the foldable chassis comprising:
    a base frame formed of first and second frontally converging base side members, each base side member having a frontal portion and a rear portion, the side members being linked at each of their respective front portions in a pin-jointed connection to a front support;
    first and second inclined arms, each inclined arm having upper and lower ends and each inclined arm being at their lower end linked in a pin-jointed connection to the front portion of the respective first or second base side member;
    a handlebar having a middle length and first and second branches, each branch having a lower front portion and an upper rear portion, each of the first and second branches of the handlebar being telescopically fitted to the respective first or second upwardly inclined arm, the front portion of each of the first and second branches being pin-jointedly linked to the rear portion of the respective first or second side member by means of respective first and second struts, the first and second struts being connected to each other with a means for locking the chassis in the unfolded position.

2. The foldable chassis for baby carriages of claim 1 wherein the middle length of the handlebar is linked in a pin-jointed connection to the branches of said handlebar and the handlebar is further provided with an intermediary articulation.

3. The foldable chassis for baby carriages of claim 1 further comprising first and second pairs of wheels, one wheel of the first pair of wheels is fitted to the rear portion of each base side member and the second pair of wheels is fitted to the front support.

4. The foldable chassis for baby carriages of claim 1 further comprising means for locking and unlocking the chassis between the folded and unfolded state, one such means being installed at the upper rear portion of the first and second branches of handlebar.

5. The foldable chassis for baby carriages of claim 1 further comprising locking means disposed at the telescoping fittings between each of the first and second branches and the upper end of the corresponding first or second inclined arm, respectively, the means being adapted to lock the branches and arms in an extended arrangement extended arrangement, said locking means further adapted to being unlocked by means of the controls provided at the upper rear portions of each branch of the handlebar.

6. The foldable chassis for baby carriages of claim 1 further comprising locking means arranged between the struts, the locking means comprising a transversal, double compass provided with two crossed, articulately fitted links.

7. The foldable chassis for baby carriages of claim 1 wherein the first and second inclined arms are coupled to each other at their front end with a flexible connection.

* * * * *